(12) United States Patent
Lindby et al.

(10) Patent No.: US 9,399,983 B2
(45) Date of Patent: Jul. 26, 2016

(54) WIND TURBINE BLADE WITH CROSS-SECTIONAL SENSORS

(75) Inventors: Torben Lindby, Gesten (DK); Ivan Engmark Mortensen, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 555 days.

(21) Appl. No.: 13/990,606

(22) PCT Filed: Dec. 19, 2011

(86) PCT No.: PCT/EP2011/073244
§ 371 (c)(1),
(2), (4) Date: May 30, 2013

(87) PCT Pub. No.: WO2012/089544
PCT Pub. Date: Jul. 5, 2012

(65) Prior Publication Data
US 2013/0280070 A1    Oct. 24, 2013

(30) Foreign Application Priority Data

Dec. 30, 2010 (EP) .................................. 10197347

(51) Int. Cl.
*F03B 3/12* (2006.01)
*F03D 11/00* (2006.01)
(Continued)

(52) U.S. Cl.
CPC ............ *F03D 11/0091* (2013.01); *F03D 1/065* (2013.01); *G01M 5/0016* (2013.01);
(Continued)

(58) Field of Classification Search
CPC .................. F03D 1/065; F03D 11/0091; F05B 2250/314; F05B 2260/80; F05B 2270/1095; F05B 2260/83; F05B 2270/17; F05B 2270/331; F05B 2270/804; F05B 2270/807; F05B 2270/808; G01M 5/0016; G01M 5/0041
USPC .............................................................. 416/1
See application file for complete search history.

(56) References Cited

U.S. PATENT DOCUMENTS

2008/0317598 A1\* 12/2008 Barbu .................... F03D 7/022
416/9
2009/0016880 A1    1/2009 Bosselmann

FOREIGN PATENT DOCUMENTS

| CA | 2714852 A1 | | 10/2010 | |
| EP | 2112375 A | | 10/2009 | |
| GB | 2454253 A | | 5/2009 | |
| GB | WO2009056869 | \* | 5/2009 | ............... F03D 1/06 |

(Continued)

*Primary Examiner* — Dwayne J White
*Assistant Examiner* — Jason Mikus
(74) *Attorney, Agent, or Firm* — Nath, Goldberg & Meyer; Jerald L. Meyer; Tanya E. Harkins

(57) ABSTRACT

A wind turbine blade extending along a longitudinal axis from a root end to a tip end and in a transverse plane perpendicular to the longitudinal axis, the transverse plane having a main axis extending through an elastic center point, wherein the wind turbine blade comprises a sensor system including a first sensor set for measuring a first bending moment in a first sensor position at a first distance from the root end, the first sensor set comprising a first primary sensor for measuring a primary component and a first secondary sensor for measuring a secondary component, wherein a first primary sensor axis in the transverse plane is oriented in a direction defined by the first primary sensor and the elastic center point, and a first secondary sensor axis in the transverse plane is oriented in a direction defined by the first secondary sensor and the elastic center point, and wherein an angle between the first primary sensor axis and the first secondary sensor axis is in the range from 50° to 130°.

11 Claims, 10 Drawing Sheets

(51) Int. Cl.
*F03D 1/06* (2006.01)
*G01M 5/00* (2006.01)

(52) U.S. Cl.
CPC ........ *G01M5/0041* (2013.01); *F05B 2250/314* (2013.01); *F05B 2260/80* (2013.01); *F05B 2270/1095* (2013.01); *Y02E 10/721* (2013.01)

(56) References Cited

FOREIGN PATENT DOCUMENTS

| WO | 2009068020 A2 | 6/2009 | |
|---|---|---|---|
| WO | WO2009140435 | * 11/2009 | ................ F03D 7/00 |

* cited by examiner

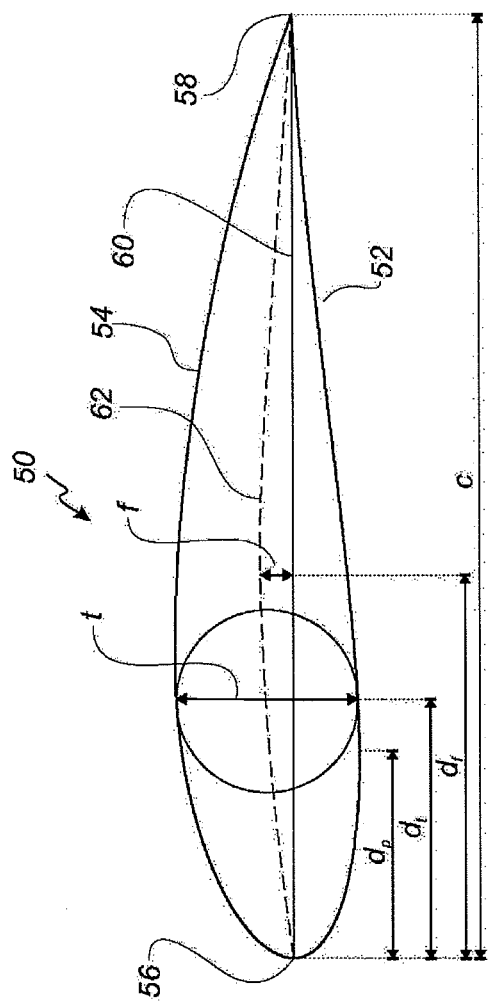
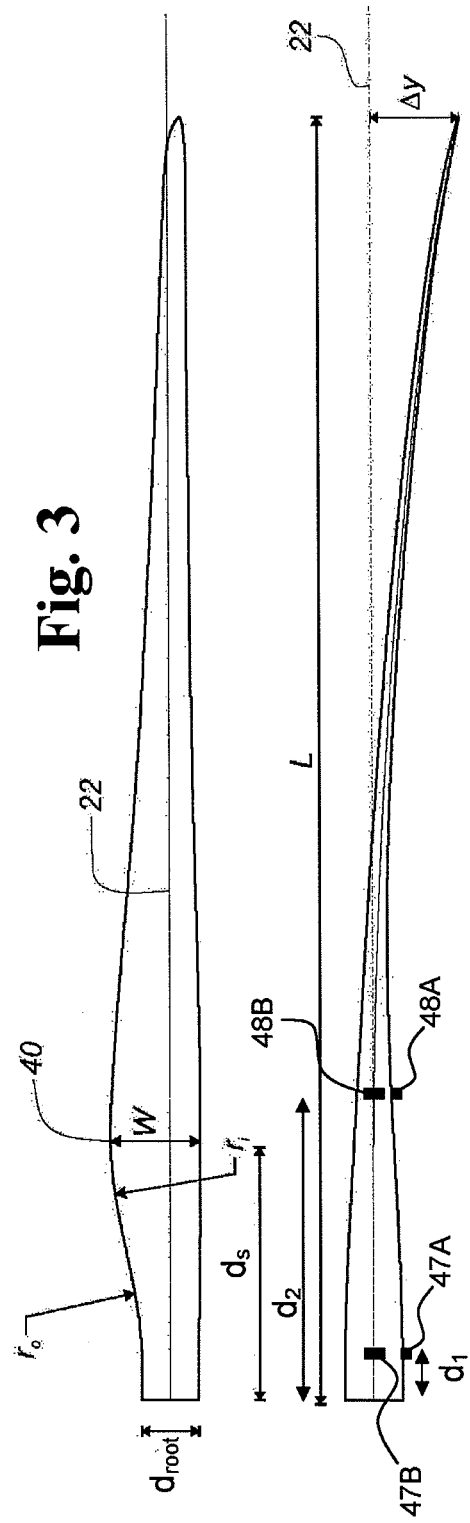
Fig. 3
Fig. 4

US 9,399,983 B2

WIND TURBINE BLADE WITH CROSS-SECTIONAL SENSORS

This is a National Phase Application filed under 35 U.S.C. 371 as a national stage of PCT/EP2011/073244, filed Dec. 19, 2011, and claims priority from European Application No. 10197347.7, filed Dec. 30, 2010, the content of each of which is hereby incorporated by reference in its entirety.

TECHNICAL FIELD

The present invention relates to a wind turbine blade, and a method and apparatus for determining or estimating loads such as bending moment of a wind turbine blade, in particular root moment near or at the root end of a wind turbine blade.

BACKGROUND

Wind turbine manufacturers are constantly making efforts to improve the efficiency of their wind turbines in order to maximise the annual energy production. Further, the wind turbine manufacturers are interested in prolonging the lifetime of their wind turbine models, since it takes a long time and a lot of resources to develop a new wind turbine model. Systems for monitoring operating parameters of a wind turbine and its components such as the wind turbine blades have become an area of increased attention in order to optimize performance and prolonging the lifetime of different components.

Accordingly, there is a need for a wind turbine blade, methods and apparatus enabling accurate and efficient monitoring of one or more operating parameters of a wind turbine or wind turbine blade. An area of particular interest may be monitoring the loads and stresses applied on a wind turbine blade during operation of a wind turbine.

DISCLOSURE OF THE INVENTION

According to a first aspect, the invention provides a wind turbine blade extending along a longitudinal axis from a root end to a tip end and in a transverse plane perpendicular to the longitudinal axis, the transverse plane having a main axis extending through an elastic center point, the wind turbine blade comprising a blade shell forming a profiled contour including a pressure side and a suction side, as well as a leading edge and a trailing edge with a chord having a chord length extending there between, the main axis being parallel to the chord, and wherein the profiled contour comprises a root region, an airfoil region and optionally a transition region. The wind turbine blade may include a sensor system comprising a first sensor set, e.g. for measuring a first bending moment, in a first sensor position at a first distance from the root end, the first sensor set comprising a first primary sensor for measuring a primary component and a first secondary sensor for measuring a secondary component, the first sensor set being arranged in the transition region or the airfoil region of the blade, wherein a first primary sensor axis in the transverse plane is oriented in a direction defined by the first primary sensor and the elastic center point, and a first secondary sensor axis in the transverse plane is oriented in a direction defined by the first secondary sensor and the elastic center point. An angle between the first primary sensor axis and the first secondary sensor axis may be in the range from 50° to 130°.

By arranging the sensors in the transition region or the airfoil, the sensor readings are not encumbered with the non-linearities that are inherent with arranging the sensors in the root region of the blade due to the connection with the hub of the wind turbine blade. Instead the moments at the root may be calculated via approximation functions and/or curve fitting. Further, by arranging the sensor so that the aforementioned sensor axes forms an angle in an interval around 90 degrees it is possible to maximize the sensitivity of the readings on the primary and secondary bending moments.

According to a second and broader aspect, the invention provides a wind turbine blade extending along a longitudinal axis from a root end to a tip end and in a transverse plane perpendicular to the longitudinal axis, the transverse plane having a main axis extending through an elastic center point, the wind turbine blade comprising a blade shell forming a profiled contour including a pressure side and a suction side, as well as a leading edge and a trailing edge with a chord having a chord length extending there between, the main axis being parallel to the chord. The wind turbine blade may include a sensor system comprising a first sensor set, e.g. for measuring a first bending moment, in a first sensor position at a first distance from the root end, the first sensor set comprising a first primary sensor for measuring a primary component and a first secondary sensor for measuring a secondary component, wherein a first primary sensor axis in the transverse plane is oriented in a direction defined by the first primary sensor and the elastic center point, and a first secondary sensor axis in the transverse plane is oriented in a direction defined by the first secondary sensor and the elastic center point. An angle between the first primary sensor axis and the first secondary sensor axis may be in the range from 50° to 130°.

Accordingly, the wind turbine blade according to the invention allows determination of bending moment with only two sensors in a cross-section saving manufacture costs.

In the following, advantageous embodiments relating to both the first and the second aspects are discussed.

Also disclosed is a wind turbine blade extending a long a longitudinal axis from a root end to a tip end and in a transverse plane perpendicular to the longitudinal axis, the transverse plane having a main axis extending through an elastic center point, the wind turbine blade comprising a blade shell forming a profiled contour including a pressure side and a suction side, as well as a leading edge and a trailing edge with a chord having a chord length extending there between, the main axis being parallel to the chord is provided. The wind turbine blade may comprise a sensor system including a plurality of sensor sets, each sensor set comprising a plurality of sensors including a primary sensor and a secondary sensor for measuring a primary component and a secondary component, respectively. The plurality of sensor sets includes a first sensor set for measuring a first bending moment in a first sensor position at a first distance from the root end, and a second sensor set for measuring a second bending moment in a second sensor position different from the first sensor position at a second distance from the root end. The first distance may be at least 1 m. The second distance may be at least 3 m.

Also disclosed is a method for estimating bending moment of a wind turbine blade, e.g. of a wind turbine blade as disclosed herein. The wind turbine blade extends along a longitudinal axis from a root end to a tip end and having a root region, a transition region and an airfoil region, the method comprising the steps of obtaining a first sensor set signal indicative of a first bending moment at a first sensor position different from the tip end along the longitudinal axis of the wind turbine blade, and estimating a bending moment at a first estimation position along the longitudinal axis based on the first sensor set signal, wherein the first sensor position is different from the first estimation position along the longitudinal axis.

Further, a blade monitoring system for monitoring a wind turbine blade comprising a sensor system is disclosed, the blade monitoring system comprising a processing unit and an interface connected to the processing unit. The processing unit is configured for receiving a first sensor set signal indicative of a first bending moment at a first sensor position of a wind turbine blade extending along a longitudinal axis from a root end to a tip end. The processing unit is configured for estimating a bending moment at a first estimation position along the longitudinal axis based on the first sensor set signal, wherein the first sensor position is different from the first estimation position along the longitudinal axis.

There is a need for a wind turbine blade having an optical sensor system with low loss.

Accordingly, a wind turbine blade is provided, the wind turbine blade extending along a longitudinal axis from a root end to a tip end and in a transverse plane perpendicular to the longitudinal axis, the transverse plane having a main axis extending through an elastic center point, the wind turbine blade comprising a blade shell forming a profiled contour including a pressure side and a suction side, as well as a leading edge and a trailing edge with a chord having a chord length extending there between, the main axis being parallel to the chord. The wind turbine blade comprises a sensor system with an optical path comprising a first optical fiber, a second optical fiber and optionally a patch optical fiber, the first optical fiber including a first core with a first core diameter, wherein the first optical fiber extends from a first end to a second end and comprising at least one sensor, the second optical fiber including a second core with a second core diameter, wherein the second optical fiber extends from a first end to a second end and comprising at least one sensor. The patch optical fiber includes a patch core with a patch core diameter, wherein the patch optical fiber extends from a first end to a second end. The patch optical fiber may connect the first optical fiber and the second optical fiber, and the first core diameter may be the same as the patch core diameter.

The sensor system with a patch optical fiber provides a high degree of design freedom in designing a wind turbine blade and provides an easily adaptable optical sensor system that may be used in different easily configurable configurations and wind turbine blade models.

Further, manufacture of the wind turbine blade may be facilitated since assembly of the sensor system does not require specialist knowledge or tools.

Further, the wind turbine blade according to the invention allows for easy reconfiguration of the sensor system after moulding and assembly of blade shell parts.

Wind turbine comprising a plurality of wind turbine blades including a first wind turbine blade as described herein, wherein the wind turbine comprises a blade monitoring system configured to estimate bending moment of the first wind turbine blade based on sensor set signals from the sensor system of the first wind turbine blade.

The present invention relates to a wind turbine blade, e.g. for a rotor of a wind turbine having a substantially horizontal rotor shaft, the rotor comprising a hub, from which the blade extends substantially in a radial direction when mounted to the hub, the blade extending along a longitudinal axis from a root end to a tip end and in a transverse plane perpendicular to the longitudinal axis, the transverse plane having a main axis extending through an elastic center point. The wind turbine blade comprises a blade shell forming a profiled contour including a pressure side and a suction side, as well as a leading edge and a trailing edge with a chord having a chord length extending there between. The profiled contour, when being impacted by incident airflow, generates a lift. The profiled contour is divided into: a root region having a substantially circular or elliptical profile closest to the root end with a root diameter being the chord length at the root end, an airfoil region having a lift-generating profile furthest away from the root end, and a transition region between the root region and the airfoil region, the transition region having a profile gradually changing in the radial direction from the circular or elliptical profile of the root region to the lift-generating profile of the airfoil region, and with a shoulder having a shoulder width and a shoulder distance and located at the boundary between the transition region and the airfoil region, wherein the blade has a blade length. By shoulder is meant the position at which the wind turbine blade has its largest chord length and the shoulder distance is the distance from the root end to the shoulder. The length interval is defined from the root end to the tip end, the root end thus being positioned at r=0 and the tip end being positioned at r=L along the longitudinal axis.

The blade may comprise a blade shell with a shell body. The shell body may for instance be assembled from a pressure side shell and a suction side shell, which are adhered or bonded to each other near the leading edge and near the trailing edge. In another embodiment, the shell is manufactured via a one-shot process, e.g. via a closed, hollow moulding method.

The shell body may comprise a longitudinally extending load carrying structure, such as a main laminate. Such a load carrying structure or main laminate is typically formed as a fibre insertion which comprises a plurality of fibre reinforcement layers, e.g. between 20 and 50 layers. On each side of the load carrying structure, the blade typically comprises a sandwich structure with a core material, such as balsa wood or foamed polymer, and with an inner and outer skin made of fibre reinforced polymer.

One or more sensors may be arranged in the main laminate or in edges thereof, e.g. the first sensor axis of one or more sensor sets may cross the main laminate or a main laminate edge.

The blade shell is typically made of a fibre reinforced polymer material. The reinforcement fibres may for instance be glass fibres, carbon fibres, aramid fibres, metallic fibres, such as steel fibres, or plant fibres, whereas the polymer for instance may be epoxy, polyester or vinylester.

The wind turbine blade comprises a sensor set comprising at least one sensor, e.g for measuring or determining bending moments. A sensor set may alternatively or in combination be configured for measuring other parameters. The at least one sensor set includes a first sensor set positioned at a first sensor position along the longitudinal axis. The first sensor set may be positioned at a first distance $d_1$ from the root end.

The wind turbine blade may comprise a plurality of sensors including the first sensor set and a second sensor set positioned at a second sensor position along the longitudinal axis. The second sensor set may be positioned at a second distance $d_2$ from the root end.

The plurality of sensor sets may include a third sensor set for measuring a third bending moment in a third sensor position at a third distance $d_3$ from the root end.

The plurality of sensor sets may include a fourth sensor set for measuring a fourth bending moment in a fourth sensor position at a fourth distance $d_4$ from the root end.

The plurality of sensor sets may include a fifth sensor set for measuring a fifth bending moment in a fifth sensor position at a fifth distance $d_5$ from the root end.

The first distance $d_1$ may be in the range from about 1 m to about 20 m and the second distance $d_2$ may be in the range from about 3 m to about 50 m.

Optionally, sensor position distances from the root end may depend on the length L of the wind turbine blade and/or the shoulder distance or position $d_s$.

The first distance $d_1$ may be selected in the range from $d_{1,min}$ to $d_{1,max}$. The first distance $d_1$ may be in the range from about 4 m to about 15 m such as in the range from about 6 m to about 10 m, preferably about 8 m.

The first distance $d_1$ may depend on the shoulder distance $d_s$, i.e. $d_1$ may be a function of the shoulder distance $d_s$. For example, $d_1$ may be given by $$d_1 = \alpha_1 d_s,$$

where $\alpha_1$ is in the range from 0.2 to 1.0.

The first distance $d_1$ may depend on the length of the wind turbine blade, i.e. $d_1$ may be a function of the blade length L. For example, $d_1$ may be given by $$d_1 = \beta_1 L,$$

where $\beta_1$ is in the range from about 0.05 to about 0.95.]

The first distance $d_1$ may depend on the root diameter $d_{root}$, i.e. $d_1$ may be a function of the root diameter $d_{root}$. The first distance $d_1$ may be at least a diameter of the root.

For example, $d_1$ may be given by $$d_1 \gamma_1 d_{root},$$

where $\gamma_1$ is at least 0.8.

The minimum first distance $d_{1,min}$ may depend on the root diameter $d_{root}$, e.g. be given by $$d_{1,min} = \gamma_1 d_{root},$$

where $\gamma_1$ is at least 0.8, such as about 1.

The maximum first distance $d_{1,max}$ may depend on the shoulder distance $d_s$, e.g. be given by $$d_{1,max} = \alpha_1 d_s,$$

where $\alpha_1$ is in the range from 0.5 to 1.0.

The shoulder distances $d_s$ may be in the range from 11 m to 15 m, e.g. about 13 m for a wind turbine blade having a length about 61.5 m.

The root diameter $d_{root}$ may be in the range from 2 m to 5 m, e.g. about 2.5 m for a wind turbine blade having a length from 40 m-50 m, or about 3.5 m for a wind turbine blade having a length from 60 m-75 m.

The second distance $d_2$ may be selected in the range from $d_{2,min}$ to $d_{2,max}$. The second distance $d_2$ may be in the range from about 5 m to about 40 m, such as in the range from about 10 m to about 30 m such as about 12 m or about 23 m.

The second distance $d_2$ may depend on the shoulder distance $d_s$, i.e. $d_2$ may be a function of the shoulder distance $d_s$. For example, $d_2$ may be given by $$d_2 = \alpha_2 d_s,$$

where $\alpha_2$ is in the range from 0.5 to 10.0.

The second distance ($d_2$) may depend on the length of the wind turbine blade, i.e. $d_2$ may be a function of the blade length L. For example, $d_2$ may be given by $$d_2 = \beta_2 L,$$

where $\beta_2$ is in the range from 0.1 to 0.8.

The second distance $d_2$ may depend on the root diameter $d_{root}$, i.e. $d_2$ may be a function of the root diameter $d_{root}$. For example, $d_2$ may be given by $$d_2 = \gamma_2 d_{root},$$

where $\gamma_2$ is at least 0.8.

The minimum second distance $d_{2,min}$ may depend on the root diameter $d_{root}$, e.g. be given by $$d_{2,min} = \gamma_2 d_{root},$$

where $\gamma_2$ is at least 0.8, such as about 2.

The maximum second distance $d_{2,max}$ may depend on the shoulder distance $d_s$, e.g. be given by $$d_{2,max} = \alpha_2 d_s,$$

where $\alpha_2$ is in the range from 0.5 to 3.0.

The distances $d_1, d_2, d_3, \ldots$ of sensor sets from the root end may be at least 6 m in order to minimize or avoid undesired non-linearities from pitch bearings in sensor measurements.

In one or more embodiments, the distances $d_1, d_2, d_3, \ldots$ of sensor sets from the root end may be less than 25 m, e.g. less than 20 m, to reduce or avoid excessive errors of superposition in sensor measurements.

The distances between sensor sets along the longitudinal axis are selected in order to facilitate desired measurements, e.g. for estimating bending moments along the wind turbine blade such as in one or more estimation positions. Distances between sensor positions are indicated as $d_{ij}$, where i and j are index numbers for sensor sets and sensors thereof.

The distance $d_{12}$ between the first sensor set and optional second sensor set along the longitudinal axis may be in the range from about 1 m to about 30 m, such as from about 3 m to about 20 m, e.g. about 4 m, about 10 m, about 15 m.

The distance $d_{13}$ between the first sensor set and optional third sensor set along the longitudinal axis may be in the range from about 1 m to about 50 m, such as from about 10 m to about 40 m, e.g. about 15 m, about 25 m, about 35 m.

The distance $d_{14}$ between the first sensor set and optional fourth sensor set along the longitudinal axis may be in the range from about 1 m to about 60 m, such as from about 15 m to about 50 m, e.g. about 20 m, about 30 m, about 40 m.

The distance $d_{15}$ between the first sensor set and optional fifth sensor set along the longitudinal axis may be in the range from about 20 m to about $L-d_1$, such as from about 20 m to about 60 m, e.g. about 30 m, about 40 m, about 50 m.

A sensor set may comprise one or more sensors. The one or more sensors of a sensor set may include a primary sensor and optionally a secondary sensor. Sensor(s) of a sensor set may be adapted to measure bending moment components, i.e. a sensor set may comprise a primary sensor for measuring a primary bending moment component $M_X$ about a first axis perpendicular to the longitudinal axis, and/or a secondary sensor for measuring a secondary bending moment component $M_Y$ about a second axis perpendicular to the longitudinal axis. In one or more embodiments, a sensor set consists of two sensors for measuring bending moment components, thereby allowing bending moment measurements on the wind turbine blade with only two sensors.

The wind turbine blade comprises a first sensor set, e.g. for measuring a first bending moment, in a first sensor position at a first distance from the root end.

The first sensor set may comprise a first primary sensor for measuring a primary component of the first bending moment ($M_{X,1}$) about a first axis perpendicular to the longitudinal axis (first primary sensor) and a first secondary sensor for measuring a secondary component of the first bending moment ($M_{Y,1}$) about a second axis perpendicular to the longitudinal axis (first secondary sensor).

The second sensor set may comprise a second primary sensor for measuring a primary component ($M_{X,2}$) of the second bending moment about a first axis perpendicular to the longitudinal axis (second primary sensor) and a second secondary sensor for measuring a secondary component of the second bending moment ($M_{Y,2}$) about a second axis perpendicular to the longitudinal axis (second secondary sensor).

Sensors of a sensor set are positioned at the same distance from the root end, i.e. in the same transverse plane. In one or more embodiments, sensors of a sensor set, e.g. a primary sensor and a secondary sensor, may be displaced along the longitudinal axis. The distance between sensors of a sensor set along the longitudinal axis should be as small as possible. The maximum distance between sensors of a sensor set may be less than 1 m, such as less than 0.5 m. Larger distances may be employed. In case of displaced sensors of a sensor set, the sensor set distance to the root is the mean distance for sensors of the sensor set.

The length L of the wind turbine blade may be at least 40 m.

Root moments of a wind turbine blade are desired from a control perspective of the wind turbine, e.g. in order to control pitch and other operating parameters in order to optimize operation and power output of the wind turbine. However, measurement of the root moment with sensors positioned at the root end of the blade is largely affected by non-linear moment contributions from the pitch bearing.

Correct positioning of sensors in a wind turbine blade is important in order to obtain a precise measurement and in order to reduce or eliminate undesired effects such as nonlinear effects. It is from a cost and manufacture perspective desired to employ a low number of sensors.

A primary sensor is positioned on a primary sensor axis extending through the elastic center in the transverse plane with the primary sensor. A secondary sensor is positioned on a secondary sensor axis extending through the elastic center in the transverse plane with the secondary sensor.

The angle between the first primary sensor axis and the first secondary sensor axis may be in the range from about 85° to about 95°. The angle between the first primary sensor axis and the first secondary sensor axis may be about 90°.

In case of perpendicular first and second sensor axes, the first bending moment $M_1$ may be given as:

$$M_1 = \sqrt{M_{X,1}^2 + M_{Y,1}^2}$$

An estimated primary component of the bending moment at the first estimation position $M_{X,est,1}$, e.g. at the root end, may be given as a function of one or more sensor signals $S_{11}$, $S_{12}$, $S_{21}$, $S_{22}$, ..., where $S_{11}$ is the first primary sensor signal, $S_{12}$ is the first secondary sensor signal, $S_{21}$ is the second primary sensor signal, $S_{22}$ is the second secondary sensor signal, etc.

An estimated secondary component of the bending moment at the first estimation position $M_{Y,est,1}$, e.g. at the root end, may be given as a function of one or more sensor signals $S_{11}$, $S_{12}$, $S_{21}$, $S_{22}$, ..., where $S_{11}$ is the first primary sensor signal, $S_{12}$ is the first secondary sensor signal, $S_{21}$ is the second primary sensor signal, $S_{22}$ is the second secondary sensor signal, etc.

Sensor signals may be multiplexed in time and/or in frequency/wavelength. Time multiplexing may be preferred for reducing the number of components in the reading unit and reduce the costs of the sensing system.

The estimated primary component of the bending moment at the first estimation position $M_{x,est,1}$ may be estimated based only on primary sensor signals from primary sensors of one or more sensor sets. The estimated secondary component of the bending moment at the first estimation position $M_{Y,est,1}$ may be estimated based only on secondary sensor signals from secondary sensors of one or more sensor sets. Additionally or alternatively, $M_{x,est,1}$ may be estimated based on secondary sensor signals from secondary sensors of one or more sensor sets and/or $M_{Y,est,1}$ may be estimated based on primary sensor signals from primary sensors of one or more sensor sets.

The bending moment $M_{est,1}$ at a first estimation position may be estimated or given as:

$$M_{est,1} = \sqrt{M_{X,est,1}^2 + M_{Y,est,1}^2}.$$

The bending moment $M_{est,1}$ at a first estimation position may be estimated or given as:

$$M_{est,1} = \sqrt{\alpha_X M_{X,est,1}^2 + \beta_Y M_{Y,est,1}^2},$$

where $\alpha_X$ and $\beta_Y$ are compensation factors for compensating for non-perpendicular first axis and second axis.

The wind turbine blade may comprise a second sensor set, e.g. for measuring a second bending moment, in a second sensor position at a second distance from the root end. The sensor set may comprise a second primary sensor for measuring a primary component and a second secondary sensor for measuring a secondary component, wherein a second primary sensor axis in the transverse plane is oriented in a direction defined by the second primary sensor and the elastic center point, and a second secondary sensor axis in the transverse plane is oriented in a direction defined by the second secondary sensor and the elastic center point. An angle between the second primary sensor axis and the second secondary sensor axis may be in the range from 50° to 130°, such as in the range from 85° to 95°. The angle between the first primary sensor axis and the first secondary sensor axis may be about 90°.

The primary sensor(s), e.g. the first primary sensor and/or the second primary sensor, may for instance be arranged at the pressure side or the suction side of the blade, advantageously at or embedded in a load carrying structure such as a main laminate of the blade shell structure.

The secondary sensor(s), e.g. the first secondary sensor and/or the second secondary sensor, may for instance be arranged at the leading edge or the trailing edge of the wind turbine blade Positioning primary and secondary sensors on the pressure side and at the leading edge, respectively, may facilitate employment of strain gauge sensors. One or more of the sensors, such as the primary and/or the secondary sensors, may be strain gauge sensors.

One or more of the sensors, such as the primary and/or the secondary sensors, may be optical sensors, such as fiber Bragg gratings.

At least one of the sensors may be embedded in the blade shell. One or more sensors may be attached to or mounted on the inner surface of the blade shell. The wind turbine blade may comprise a beam attached to the shell and at least one of the sensors may in this case be mounted on the beam. One or more sensors may be mounted on or embedded in the main laminate of a shell body.

The wind turbine blade may comprise a web attached to the shell and at least one of the sensors may be mounted on the web.

The one or more sensor sets, e.g. the first sensor set, and/or the second sensor set may be arranged in the root region, the transition region or the airfoil region of the wind turbine blade.

The sensors of the wind turbine blade provide sensor signals indicative of a bending moment, e.g. in the form of strain/pressure signals indicating strain/pressure applied to the sensor. The strain/pressure signals of sensors can be transformed to bending moments or components thereof by use of sensor systems parameters, e.g. determined during calibration and/or design of the wind turbine blade.

A sensor signal indicative of a bending moment may be an optical signal from an optical sensor, e.g. a fiber Bragg grating, in an optical fiber, where the sensor signal is reflected light having a wavelength depending on the strain applied to the sensor. The sensor signal may be fed to a reading unit positioned e.g. in the wind turbine blade or in the hub of a wind turbine. The reading unit may be configured to determine or derive the wavelength of one or more sensor signals and provide the wavelength(s) of sensor signal(s) to a processing unit in a blade monitoring system. The reading unit may be a separate device connectable to a sensor system and a blade monitoring system for receiving sensor signals and forwarding processed sensor signals to the blade monitoring system. In one or more embodiments, the reading unit may be embedded in the blade monitoring system, i.e. the blade monitoring system comprises the reading unit and is connectable to the sensor system via one or more sensor ports of the interface.

In one or more embodiments where the sensors are implemented as fiber Bragg gratings in an optical fiber, the sensor signals are optical signals with wavelengths $\lambda_{11}$ (first primary sensor), $\lambda_{12}$ (first secondary sensor), $\lambda_{21}$, (second primary sensor), $\lambda_{22}$ (second secondary sensor), ..., $\lambda_{ij}$ where i and j are index numbers for sensor sets and sensors thereof. The sensor signals may be multiplexed in time and/or frequency/wavelength. The strain and/or pressure applied to the sensors may be derived from the wavelengths of the sensor signals. The processing unit may be configured to derive bending moments and/or components thereof from the sensor signals, e.g. based on sensor system parameters stored in a memory unit.

For a wind turbine with an optical sensor system including a second optical fiber and a patch optical fiber, the second core diameter may be the same. The optical path in the sensor system may have the same diameter, i.e. different optical fibers in the system may have the same core diameter or mode field diameter.

The first optical fiber may comprise a first primary sensor and optionally a second primary sensor for indicating strain at a first distance and optionally at a second distance, respectively, from the root end of the wind turbine blade.

The second optical fiber may comprise a first secondary sensor and optionally a second secondary sensor for indicating strain at a first distance and optionally at a second distance, respectively, from the root end of the wind turbine blade.

Standard patch optical fibers have a core diameter of 9 μm. A sensing fiber typically has a core diameter of less than 7 μm. Having the same core diameter in the first optical fiber and the patch optical fiber provides an optical path with low damping and thus a sensor system with low loss is provided. An optical sensor system with low loss, e.g. less than 3.5 dB, may be provided in order to meet sensor system requirements from the reading unit or in order to reduce the requirements to the reading unit.

The sensor system may comprise a plurality of patch optical fibers with the same patch core diameter.

The sensor system may comprise a number of optical fibers, each optical fiber comprising one or more sensors, including a third optical fiber and/or a fourth optical fiber. The third optical fiber may be positioned parallel and adjacent to the first optical fiber in the wind turbine blade and/or the fourth optical fiber may be positioned parallel and adjacent to the second optical fiber in the wind turbine blade. More than two optical fibers with sensors may allow for easy repair of the sensor system. For example, if the first optical fiber breaks, the patch optical fiber is simply connected to the third optical fiber and the blade monitoring system is configured to estimate bending moments based on sensor signals from sensors in the second and third optical fiber instead of estimating bending moments based on sensor signals from sensors in the first and second optical fiber.

Provision of one or more patch cables with the same core diameters as the optical fibers with sensor(s) facilitates a high degree of freedom for the blade designer.

An optical fiber with a relatively small core diameter, e.g. less than 7 μm, may be preferred for sensing in the wind turbine blade where a low bend-induced loss may be of importance. A core diameter of 4.2 μm may be used since a high photosensitivity may be desirable in order to facilitate fabrication of certain types of fiber Bragg gratings (FBGs).

Accordingly, the first core diameter, the second core diameter and/or the patch core diameter may be less than 7 μm, such as 6.4 μm, 5.3 μm or 4.2 μm.

The first and/or second optical fibers may be single mode fiber(s) with a design wavelength of 1550 nm.

The patch optical fiber(s) may be single mode fiber(s) with a design wavelength of 1550 nm.

In one or more embodiments, the first and second optical fibers and the patch optical fiber are optical fibers having MFD of 6.4 μm and outer diameter of 80 μm.

In one or more embodiments the first and second optical fibers and the patch optical fiber are optical fibers having MFD of 4.2 μm and outer diameter of 125 μm.

The optical fibers may have a cut-off wavelength in the range from 1350 to 1500 nm.

The optical fibers may be SM1500(4.2/125) optical fibers.

The distance between sensors of the sensor system may be at least 3 m along the optical path of the sensor system. In particular, the distance between the first primary sensor and the second primary sensor may be at least 3 m, e.g. at least 5 m, at least 8 m, along the first optical fiber in order to enable sensing at distances along the longitudinal axis of the wind turbine. The distance between the first secondary sensor and the second secondary sensor may be at least 3 m along the second optical fiber, e.g. at least 5 m, at least 8 m.

An inter-sensor distance of at least 3 m facilitates time multiplexing of sensor signals. The distances between sensors in an optical fiber are selected in order to arrange sensors in desired positions in the wind turbine blade.

The first optical fiber and the second optical fiber may be mainly or at least partly embedded in the blade shell. Preferably, one or more ends of the first optical fiber and/or the second optical fiber are provided with connector parts for coupling or connection to a patch optical fiber, a reading unit or another optical fiber with sensors. The connector part(s) may be embedded or accommodated in one or more connector boxes mounted on or moulded into the blade shell for allowing easy installation of one or more patch optical fibers. Connector parts at ends of the optical fibers provide optical coupling of the fiber cores of the optical fibers.

The first optical fiber and the second optical fiber may be at least partly adhered or mounted to the blade shell.

The wind turbine blade may comprise a reading unit comprising at least one sensor port including a first sensor port for optically coupling the sensor system, e.g. the first optical fiber, to the reading unit. The reading unit may be configured for reading sensor signals of optical sensors in the sensor system as described above. The reading unit may be configured to derive a plurality of sensor signals indicative of strain on sensors of the sensor system in the wind turbine blade.

The reading unit may comprise a second sensor port, for example such that the second end of the second optical fiber can be optically coupled to the second sensor port for reading sensor signals of optical sensors in the sensor system. This configuration in combination with optical coupling of the second end of the first optical fiber and the first end of the second optical fiber enables monitoring of sensors even in case of a damage at a single point in the optical path formed by the first optical fiber and the second optical fiber.

The temperature may affect operation and characteristics of sensors, i.e. the sensor signals from the optical sensors may depend on the temperature. A temperature-insensitive determination of bending moment may be desired.

Accordingly, the sensor system may comprise a first temperature sensor in the first optical fiber and/or a second temperature sensor in the second optical fiber. A fiber Bragg grating (FBG) of an optical fiber may be arranged in the wind turbine blade such that no changes in strain or pressure are applied to the FBG. Thereby the FBG may function as a temperature sensor.

The first core diameter of the first optical fiber may be equal to the second core diameter of the second optical fiber.

The sensor system may comprise a beam splitting/combining unit having a first, second and third port, wherein the first port is optically coupled to the first end of the first optical fiber and the second port is optically coupled to the second end of the second optical fiber, such that sensor signals from the first optical fiber are combined with sensor signals from the second optical fiber on the third port connected to a reading unit.

The processing unit may be configured to compensate for temperature variation, i.e. estimation of bending moments may comprise applying a compensation factor to the sensor signals, the compensation factor being based on one or more temperature signals from the first temperature sensor and/or the second temperature sensor.

Optical sensors are preferred in order to reduce or eliminate the damages of lightning strike.

The first optical fiber may comprise a first end connector part and/or a second end connector part for connecting the first end and second end, respectively, to a reading unit, a blade monitoring system and/or other optical fibers.

The second optical fiber may comprise a first end connector part and/or a second end connector part for connecting the first end and second end, respectively, to a reading unit, a blade monitoring system and/or other optical fibers.

The connector parts may be an E2000 connector.

In the method for estimating bending moment of a wind turbine blade, estimating a bending moment at a first estimation position may be carried out assuming a zero bending moment at the tip end of the wind turbine blade.

The distance between the first sensor position and the first estimation position along the longitudinal axis may be at least 1 m, such as at least 3 m, preferably in the range from 3 m to about 12 m.

During operation of a wind turbine, information on loads on the wind turbine blade may be of interest from a turbine control viewpoint. Accordingly, information on root moments of wind turbine blade may be a desired parameter. The first estimation position may be any position along the longitudinal axis, such as at the root end of the wind turbine blade.

The first bending moment may have a primary component about a first axis perpendicular to the longitudinal axis and/or a secondary component about a second axis perpendicular to the longitudinal axis.

The method may comprise obtaining a second sensor set signal indicative of a second bending moment at a second sensor position along the longitudinal axis and estimating a bending moment at a first estimation position may be based on the second sensor set signal.

In the method, the distance between the first sensor position and the second sensor position along the longitudinal axis may be at least 1 m.

The second bending moment may have a primary component about a first axis perpendicular to the longitudinal axis and a secondary component about a second axis perpendicular to the longitudinal axis.

The first axis and the second axis may be perpendicular or form an angle, e.g. the smallest angle may be in the range from 75° to about 90°.

The first axis may be perpendicular to the primary sensor axis. The second axis may be perpendicular to the secondary sensor axis.

In the method and in the blade monitoring system, estimating a bending moment may comprise estimating a primary component $M_{X,est}$ about a first axis perpendicular to the longitudinal axis and/or a secondary component $M_{Y,est}$ about a second axis perpendicular to the longitudinal axis at a first estimation position and/or at a second estimation position along the longitudinal axis. Estimating a bending moment may comprise curve fitting.

In the method and in the blade monitoring system, the bending moment $M_{est,1}$ or components thereof $M_{X,est,1}$ and/or $M_{Y,est,1}$ at the first estimation position may be estimated by using a first approximation function from the tip end to the first sensor position and a second approximation function from the first sensor position to the first estimation position. The second approximation function may be based on the first approximation function. Different approximation functions may be employed for primary and secondary components, i.e. a first and second primary approximation function may be employed for the primary component and a first and second secondary approximation function may be employed for the secondary component The first approximation function may be selected from a cubic spline function and a polynomial function. The polynomial function may be a first order, a second order, a third order, a fourth or higher order polynomial function. The second approximation function may be a linear interpolation.

The first sensor position may be located in the transition region or the airfoil region of the wind turbine blade.

The method may comprise transmitting the estimated bending moment or components thereof to a control system of a wind turbine, e.g. a blade monitoring system, pitch control system, a wind turbine controller, a wind park controller, alarm system or the like.

The blade monitoring system may be configured for implementing one or more parts or steps of the method described herein. The blade monitoring system enables determination and estimation of bending moments or components thereof applied to one or more wind turbine blades of a wind turbine, e.g. during operation of the wind turbine. Thus, the invention allows for a control system of the wind turbine to adjust operational parameters such as pitch angles in order to optimize power production and lifetime of the wind turbine and wind turbine blades.

The blade monitoring system may comprise a memory unit connected to the processing unit, the memory unit being configured for storing sensor system parameters of the sensor system. The processing unit may be configured for estimating a bending moment based on sensor system parameters stored in the memory unit, e.g. sensor system parameters derived during calibration or manufacture of the wind turbine blade.

BRIEF DESCRIPTION OF THE DRAWINGS

The above and other features and advantages of the present invention will become readily apparent to those skilled in the art by the following detailed description of exemplary embodiments thereof with reference to the attached drawings, in which:

FIG. 3 is a cross section of a wind turbine blade,
FIG. 4 illustrates different views of a wind turbine blade.

DETAILED DESCRIPTION OF THE INVENTION

Figure 1:
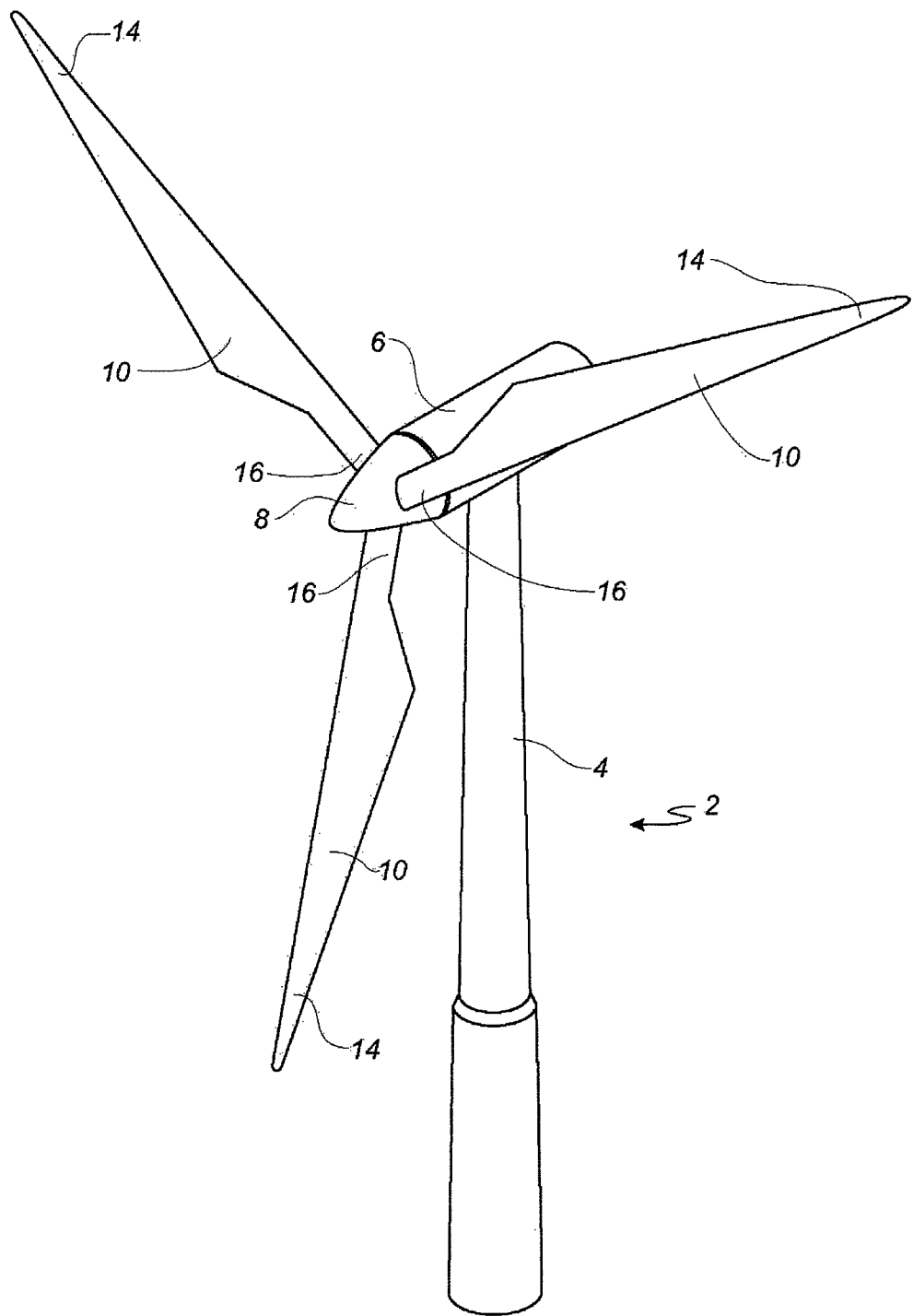
FIG. 1 illustrates a wind turbine.

The figures are schematic and simplified for clarity, and they merely show details which are essential to the understanding of the invention, while other details have been left out. Throughout, the same reference numerals are used for identical or corresponding parts.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
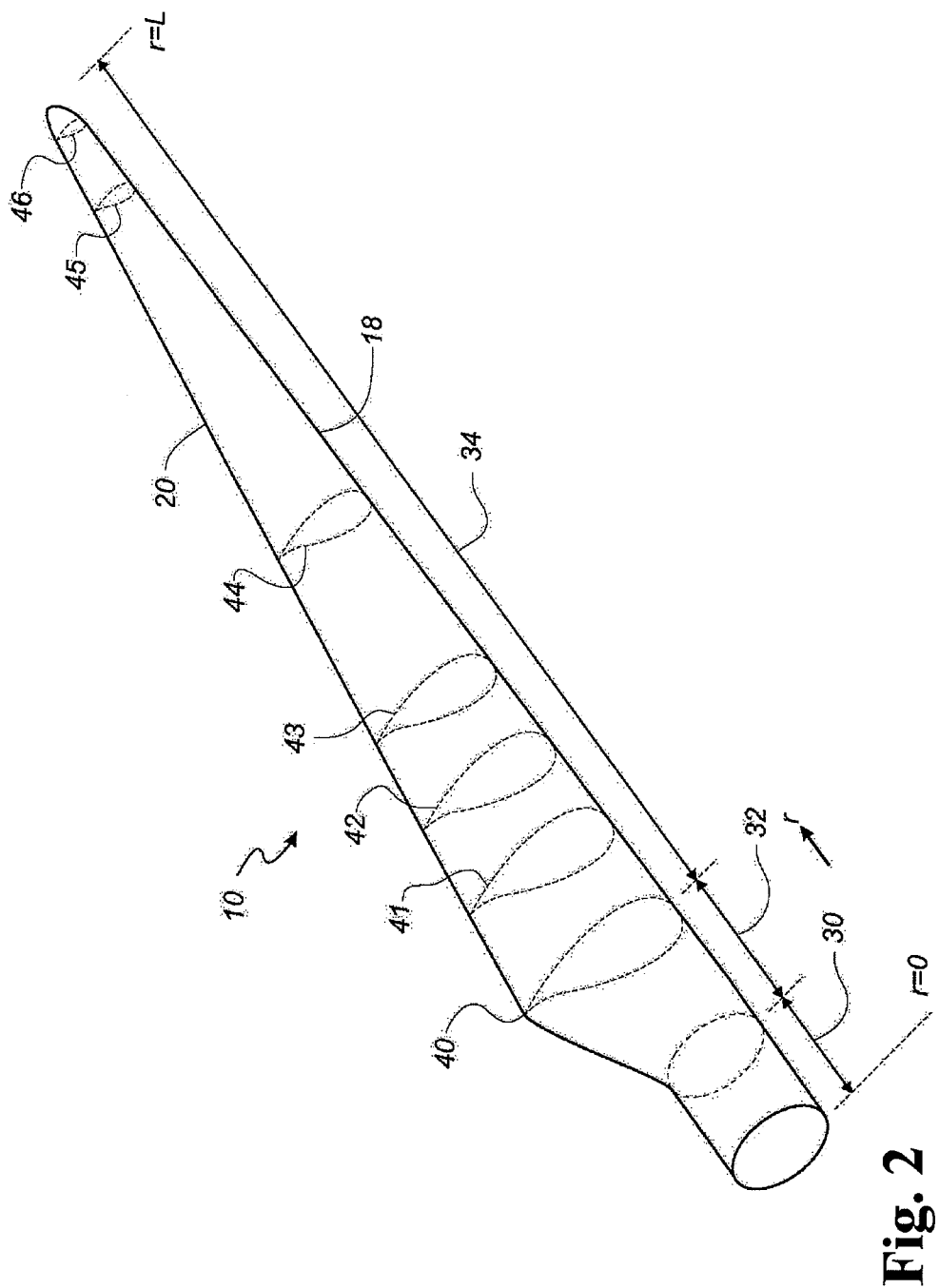
FIG. 2 illustrates a wind turbine blade.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direct ion of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord in the airfoil region decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

The blade 10 has different airfoil profiles 41, 42, 43, 44, 45, 46 along the longitudinal axis of the blade.

As illustrated in FIG. 4, the wind turbine blade 10 comprises at least one sensor set including a first sensor set positioned at a first position along the longitudinal axis.

The first sensor set comprises a first primary sensor 47A and optionally a first secondary sensor 47B positioned at a first distance $d_1$ from the root end. The sensor 47A and the sensor 47B may be displaced a distance $d_{1,12}$ along the longitudinal direction. The distance $d_{1,12}$ may be less than 1 m.

Optionally, the wind turbine blade 10 comprises a second sensor set positioned at a second position along the longitudinal axis. The second sensor set comprises a second primary sensor 48A and optionally a second secondary sensor 48B positioned at a second distance $d_2$ from the root end. The sensor 48A and the sensor 48B may be displaced a distance $d_{2,12}$ along the longitudinal direction. The distance $d_{2,12}$ may be less than 1 m.

In the wind turbine blade 10, the sensors are optical sensors in the form of an optical fiber with fiber Bragg gratings embedded in the shell of the wind turbine blade. The sensors of the wind turbine blade may be a part of the same optical fiber and/or be a part of different optical fiber sections coupled by one or more optical connectors.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Table 1 below illustrates different suitable combinations of sensor positions (distances from the root end), optionally dependent on the length of the wind turbine blade.

TABLE 1

| Sensor positions. | | | | | |
|---|---|---|---|---|---|
| $d_1$/m | $d_2$*/m | $d_3$*/m | $d_4$*/m | $d_5$*/m | L/m |
| 2-L | 3-L | 10-L | 20-L | 30-L | ≥40 |
| 2-20 | 3-40 | 10-45 | | | |
| 4-15 | 5-30 | | | | |
| 4-10 | 10-30 | | | | |
| 6-10 | 10-15 | 15-20 | | | |
| 5 | 10 | | | | |
| 8 | 12 | 23 | 40 | 50 | ≥60 |
| 1.5 * $d_{root}$ | 0.9 * $d_s$ | | | | |
| 8 | $d_1 + d_{12}$ | | | | |
| 8 | 12 | | | | |
| 8 | 23 | 40 | | | |

*if present

Sensor position configuration may depend on the number of sensor sets available and estimation position(s). A sensor position near the root end may be desirable, however a sensor position too near the root end is not desirable due to contributions or noise from the pitch bearings.

FIGS. 3 and 4 depict parameters, which may be used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=d_s$, and has a shoulder width W, which equals the chord length at the shoulder 40. The diameter of the root is defined as $d_{root}$. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a pre-bend, which is defined as Δy, which corresponds to the out of plane deflection from a pitch axis 22 of the blade.

Figure 5:
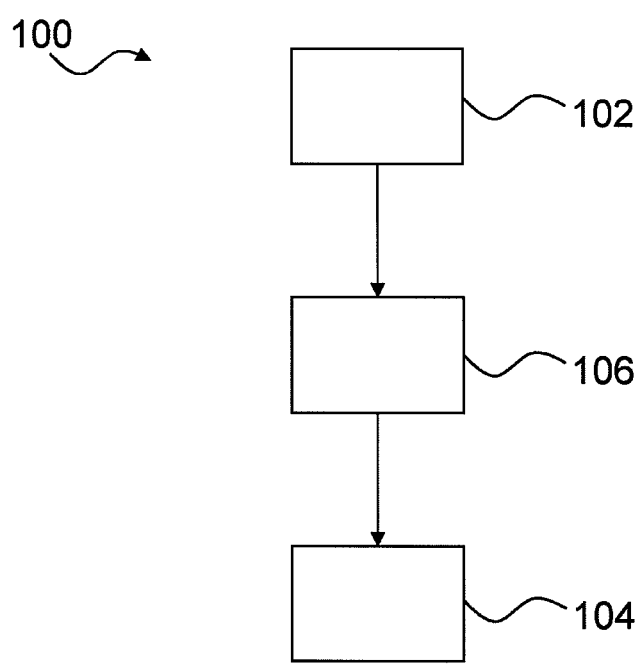
FIG. 5 is a flow diagram of an exemplary method according to the invention.

FIG. 5 illustrates an exemplary method according to the present invention. The method 100 comprises obtaining 102 a first sensor set signal indicative of a first bending moment at a first sensor position along the longitudinal axis of the wind turbine blade. Further, the method 100 comprises estimating 104 a bending moment at a first estimation position along the longitudinal axis based on the first sensor set signal, wherein the first sensor position is different from the first estimation position along the longitudinal axis. The method may be employed on a wind turbine blade as described herein. Optionally, the method 100 comprises obtaining 106 a second sensor set signal indicative of a second bending moment at a second sensor position along the longitudinal axis, and estimating 104 a bending moment is based on the second sensor set signal. Sensor signals may be obtained serially and/or in parallel.

The first sensor set signal comprises a first primary sensor signal from a first primary sensor (47A) and a first secondary sensor signal from a first secondary sensor (47B). The first primary sensor signal indicates a primary component $M_{X,1}$ of the first bending moment and the first secondary sensor signal indicates a secondary component $M_{Y,1}$ of the first bending moment.

Figure 6:
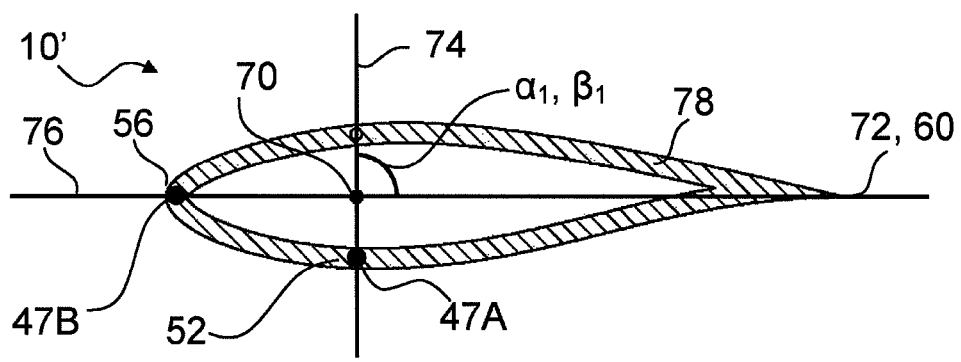
FIG. 6 illustrates a cross section of a wind turbine blade.
Figure 7:
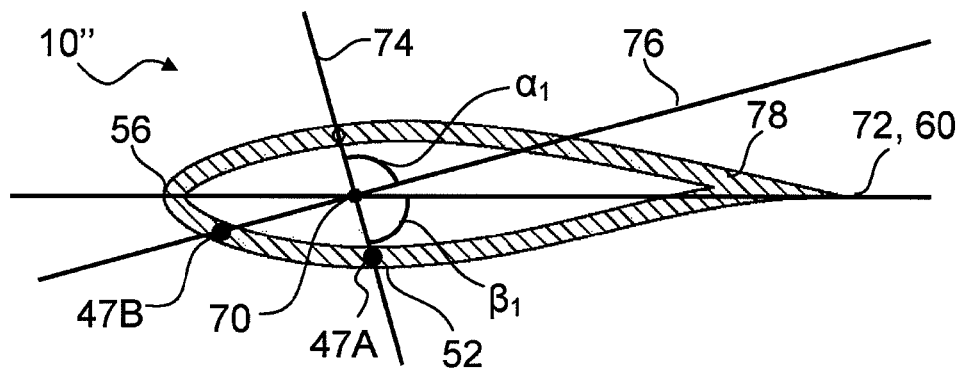
FIG. 7 illustrates a cross section of a wind turbine blade.

FIG. 6 and FIG. 7 are cross sections illustrating examples of sensor set positioning on a wind turbine blade.

In FIG. 6, the wind turbine blade 10' comprises a first sensor set with a first primary sensor 47A and a second primary sensor 47B at a first distance $d_1$ from the root. The first primary sensor 47A lies on a first primary sensor axis 74 extending through the elastic center 70 of the blade cross section (transverse plane at first distance $d_1$). The first secondary sensor 47B lies on a first secondary sensor axis 76 extending through the elastic center 70 of the blade cross section. In FIG. 6, the elastic center lies on the chord 60 and thus the main axis 72 coincide with the chord 60. The angle $\alpha_1$ between the two sensor axes 74 and 76 is 90°. The angle $\beta_1$ between the main axis 72 and the first primary sensor axis 74 is 90°

In FIG. 7, the wind turbine blade 10" comprises a first sensor set with a first primary sensor 47A and a second primary sensor 47B at a first distance $d_1$ from the root.

The first primary sensor 47A lies on a first primary sensor axis 74 extending through the elastic center 70 of the blade cross section (transverse plane at first distance $d_1$). The first secondary sensor 47B lies on a first secondary sensor axis 76 extending through the elastic center 70 of the blade cross section. In FIG. 7, the elastic center lies on the chord 60 and thus the main axis 72 coincide with the chord 60. The angle $\alpha_1$ between the two sensor axes 74 and 76 is 90°. The angle $\beta_1$ between the main axis 72 and the first primary sensor axis 74 is 75°.

In FIG. 6 and FIG. 7, the sensors are embedded in the shell body 78 of the wind turbine blade.

Figure 8:
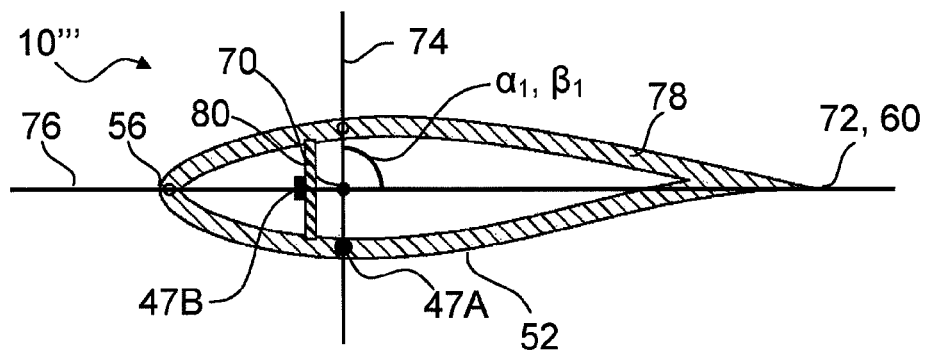
FIG. 8 illustrates a cross section of a wind turbine blade.

FIG. 8 is a cross section illustrating an example of sensor set positioning on a wind turbine blade. The wind turbine blade 10''' comprises a beam 80 attached to the shell body 78 and the second primary sensor 47B is attached to the beam 80 nearest the leading edge 56.

Figure 9:
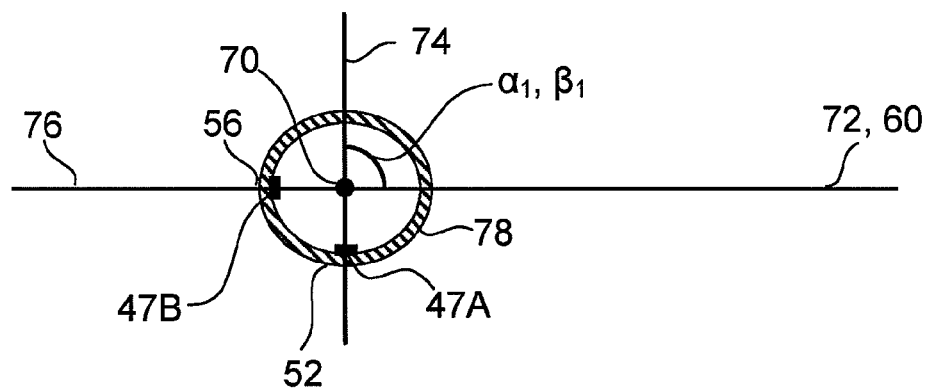
FIG. 9 illustrates a cross section of a wind turbine blade.

FIG. 9 is a cross section illustrating an example of first sensor set positioning on a wind turbine blade at a first distance $d_1$. The wind turbine blade comprises a shell body 78 and the sensors 47A, 47B are mounted on the inner surface of the shell body 78. The angle $\alpha_1$ between sensor axes 74 and 76 is 90°.

Figure 10:
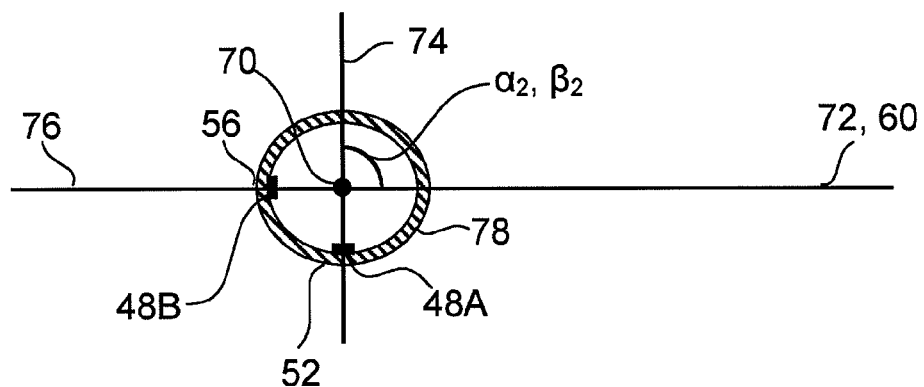
FIG. 10 illustrates a cross section of a wind turbine blade.

FIG. 10 is a cross section illustrating an example of second sensor set positioning on a wind turbine blade at a second distance $d_2$. The wind turbine blade comprises a shell body 78 and the sensors 48A, 48B are mounted on the inner surface of the shell body 78. The angle $\alpha_2$ between sensor axes 74 and 76 is 90°.

Figure 11:
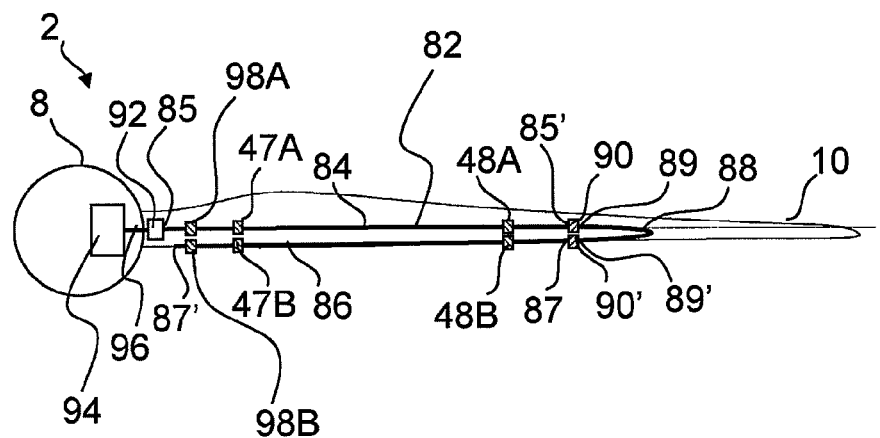
FIG. 11 illustrates a wind turbine blade with sensor system according to the invention,
FIG. 12 schematically illustrates a first optical fiber and a patch optical fiber.

FIG. 11 illustrates a part of a wind turbine. The wind turbine comprises a hub 8 from which the blades whereof a first wind turbine blade 10 is shown extend substantially in a radial direction when mounted to the hub 8. The wind turbine blade 10 comprises a sensor system 82 with an optical path comprising a first optical fiber 84, a second optical fiber 86 and a patch optical fiber 88. Optical connector 90 couples the first optical fiber 84 and the patch optical fiber 88 and optical connector 90' couples the second optical fiber 86 to the patch optical fiber 88. The optical fibers 84, 86, 88 are SM1500 (4.2/125) fibers. The first optical fiber comprises first primary sensor 47A and second primary sensor 48A in the form of fiber Bragg gratings and optionally first temperature sensor 98A. The second optical fiber comprises first secondary sensor 47B and second secondary sensor 48B in the form of fiber Bragg gratings and optionally second temperature sensor 98B. The first end 85 of the first optical fiber 84 is coupled to a reading unit 92 for reading sensor signals from the sensor system 82. The reading unit 92 provides wavelength values of the sensor signals to a blade monitoring system 94 via a data cable 96. The blade monitoring system is configured for estimating components of the bending moment at the root end of the wind turbine blade based on the sensor signals and configured for transmitting the estimated bending moment to a turbine controller (not shown). The second end 85' of the first optical connector 84 is optically coupled to the first end 89 of the patch optical fiber 88 in connector or connector assembly 90. The second end 89' of the patch optical fiber 88 is optically coupled to the first end 87 of the second optical fiber 86 in connector or connector assembly 90'.

Figure 12:
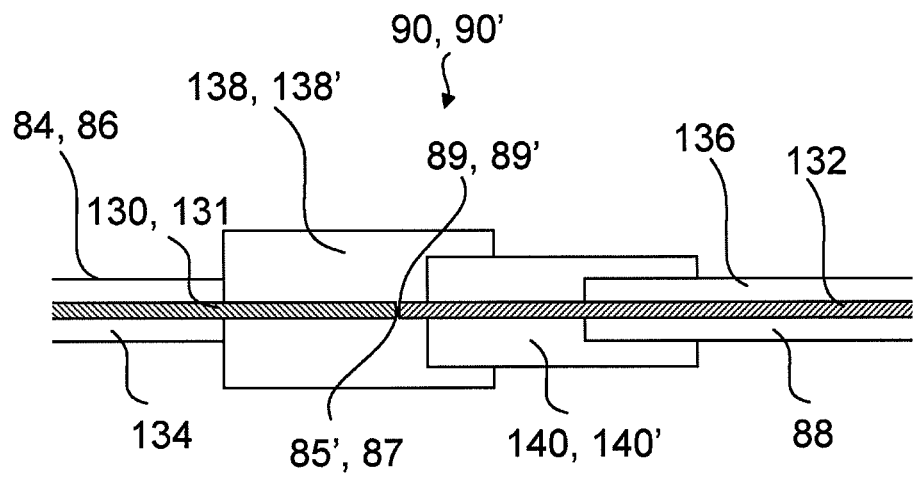

FIG. 12 schematically illustrates the optical connectors or connector assemblies 90 between the first optical fiber 84 and the patch fiber 88. The first optical fiber 84 comprises a first core 130 with a first core diameter $d_{core,1}$. The patch optical fiber 88 comprises a patch core 132 with a patch core diameter $d_{core,p}=d_{core,1}=4.2$ μm. Fiber cladding material and sheet 134, 136 protect the cores 130, 131, 132. The first optical fiber 84 comprises a first end connector part at the first end (not shown) and a second end connector part 138 (e.g. female E2000 connector) at the second end 85', and the patch optical fiber comprises a first end connector part 140 (e.g. male E2000 connector) for connecting the first optical fiber 84 and the patch optical fiber 88. The connector assembly 90' is formed in the same way as the connector assembly 90 indicated by the reference numbers.

The second optical fiber 86 includes a second core 131 with a second core diameter $d_{core,2}=d_{core,p}$, wherein the second optical fiber extends from a first end to a second end and comprising at least one sensor. The second optical fiber 86 comprises a first end connector part 138' (e.g. female E2000 connector) at the first end 87 and a second end connector part (not shown) at the second end, and the patch optical fiber comprises a second end connector part 140' (e.g. male E2000 connector) for connecting the second optical fiber 86 and the patch optical fiber 88.

Figure 13:
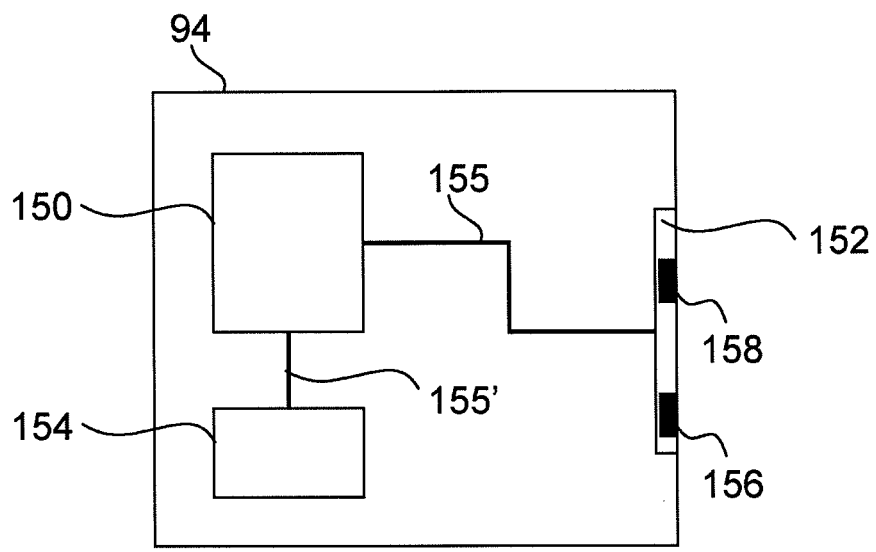
FIG. 13 illustrates a blade monitoring system.

FIG. 13 schematically illustrates a blade monitoring system 94. The blade monitoring system 94 comprises a housing 95 accommodating a processing unit 150 connected to an interface 152 and a memory unit 154 via connections 155, 155', respectively. The interface 152 comprises a first connector port 156 and a second connector port 158. The first connector port 156 is configured for connection to a reading unit for receiving data of sensor signals from a sensor system of a wind turbine blade. The second connector port 158 is configured for connection to a turbine controller for transmitting and/or sending data and/or control/alarm signals to a turbine controller.

The processing unit 150 is configured for receiving a first sensor set signal indicative of a first bending moment at a first sensor position of a wind turbine blade extending along a longitudinal axis from a root end to a tip end via the first connector port 156. Further, the processing unit 150 is configured for estimating a bending moment or components thereof at a first estimation position along the longitudinal axis based on the first sensor set signal, wherein the first sensor position is different from the first estimation position along the longitudinal axis.

Figure 14:
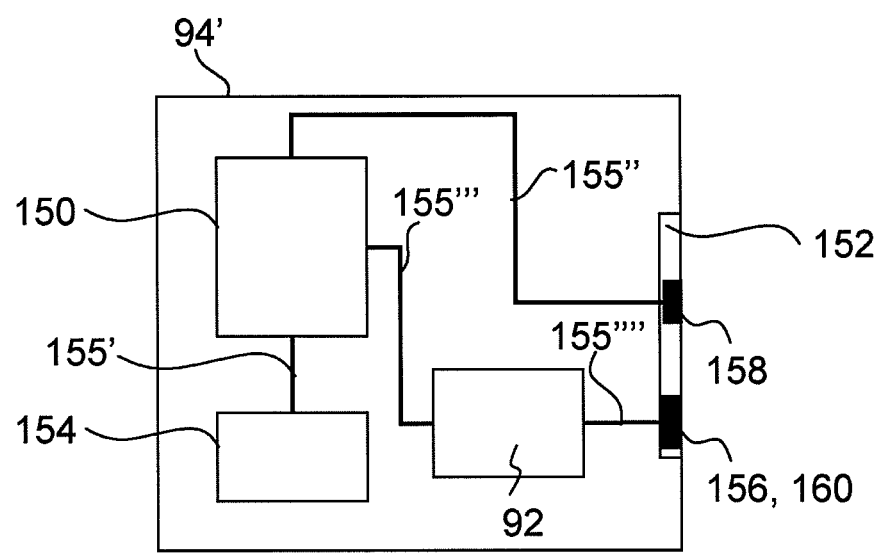
FIG. 14 illustrates a blade monitoring system.

FIG. 14 schematically illustrates a blade monitoring system 94' wherein a reading unit 92 is integrated in the blade monitoring system and connected to the processing unit 150 via connection 155". The interface 152 comprises a first connector port 156 in the form of a first sensor port 160 for coupling the sensor system, e.g. the first optical fiber 84, (optionally via a patch optical fiber) to the reading unit 92 of the blade monitoring system 94'.

Figure 15:
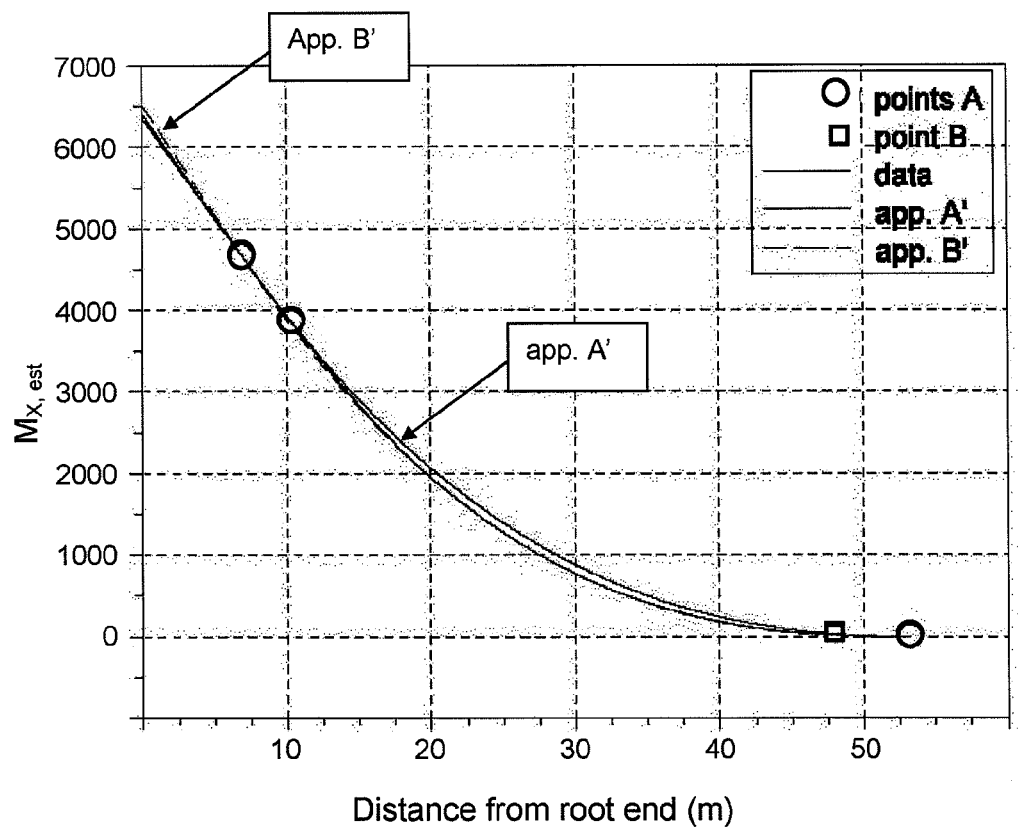
FIG. 15 illustrates estimated bending moment with curve fitting.

FIG. 15 schematically illustrates estimation of a primary component $M_{X,est,1}$ of bending moment at the root end (first estimation position) of a wind turbine blade having L=53.2 m. The first distance $d_1$ is 7 m and the second distance $d_2$ is 10.5 m. The primary component $M_{X,est,1}$ is estimated based on a first primary sensor signal $S_{11}$ from a first primary sensor at $d_1$ and a second primary sensor signal $S_{21}$ from a second primary sensor at $d_2$.

It has been shown that using cubic spline functions from the first primary sensor to the tip end of the wind turbine blade and then using the gradient or derivative of the bending moment at the first distance to perform a linear extrapolation from $d_1$ to the root end may be preferred. Gradients of the bending moment at the tip end are zero. Further, the bending moment gradient at $d_1$ may be estimated based on the bending moments at $d_1$ and $d_2$, e.g. with a backward Euler method. A large distance between the first and second sensor sets may not be desirable.

The estimation as illustrated in FIG. 15 comprises the following steps using measured bending moment components at $d_1$ and $d_2$:

A first cubic spline function with "correct" boundary conditions using the two measurement points and the tip end point where the bending moment is zero is fitted used to perform the interpolation of a point near the end of the wind turbine blade. Here "correct" means that the first derivatives at the two ends of the interval are correct, the bending moment gradient at $d_1$ is estimated using the measured sensor data transformed to bending moments at $d_1$ ($M_{X,1}$) and $d_2$ ($M_{X,2}$) with a backward Euler method, and the derivative at the tip end is zero. The three points, i.e. $d_1$, $d_2$ and the tip end point are denoted points A in FIG. 15. The interpolated point near the end of the wind turbine blade is denoted point B.

Then a second spline function, covering the interval from $d_1$ to the tip end is constructed using a "not-a-knot" method where the points A and B are used.

Then, the second spline function is extended to the root end with a linear extrapolation denoted app. A' between $d_1$ and the root end.

The "not-a-knot" method means that the third order derivative at the second and second last point of the domain used for interpolation is the same when looking from each side of the point.

FIG. 15 illustrates estimations of the bending moment. In the graph, app. A' represents sensor positions at $d_1=7$ m and $d_2=10.5$ m, and app. B' represents sensor positions at $d_1=7$ m and $d_2=20$ m. As can be seen on FIG. 15, app A' provides a better estimation of primary component near the root end while app B' provides a better estimation between 10 m and 50 m from the root end.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

LIST OF REFERENCE NUMERALS 2 wind turbine
4 tower
6 nacelle
8 hub
10, 10', 10",
10''' wind turbine blade
14 blade tip
16 blade root 18 leading edge
20 trailing edge
22 pitch axis
30 root region
32 transition region
34 airfoil region
40 shoulder
41, 42, 43,
44, 45, 46 airfoil profile
47A first primary sensor
47B first secondary sensor
48A second primary sensor
48B second secondary sensor
50 airfoil profile
52 pressure side
54 suction side
56 leading edge
58 trailing edge
60 chord
62 camber line/median line
70 elastic center
72 main axis
74 primary sensor axis
76 secondary sensor axis
78 shell body
80 beam
82 sensor system
84 first optical fiber
85 first end of first optical fiber
85' second end of first optical fiber
86 second optical fiber
87 first end of second optical fiber
87' second end of second optical fiber
88 patch optical fiber
89 first end of patch optical fiber
89' second end of patch optical fiber
90, 90' optical connector
92 reading unit
94 blade monitoring system
94' blade monitoring system
95 housing
96 data cable
98A first temperature sensor
98B second temperature sensor
99 beam splitting/combining unit
130 first core
131 second core
132 patch core
134 fiber cladding material and sheet
136 fiber cladding material and sheet
138 second end connector part of first optical fiber
138' first end connector part of second optical fiber
140 first end connector part of patch optical fiber
140' second end connector part of patch optical fiber
150 processing unit
152 interface
154 memory unit
155, 155',155",
155''', 155"" connection
156 first connector port
158 second connector port
160 sensor port
c chord length
$d_t$ position of maximum thickness
$d_f$ position of maximum camber
$d_p$ position of maximum pressure side camber
$d_s$ shoulder distance
$d_{root}$ root diameter
f camber
L blade length
P power output
r local radius, radial distance from blade root
t thickness
$v_w$ wind speed
θ twist, pitch
Δy prebend
$α_1$ angle between first primary sensor axis and first secondary sensor axis
$α_2$ angle between second primary sensor axis and second secondary sensor axis.
$β_1$ angle between first primary sensor axis and main axis
$β_2$ angle between second primary sensor axis and main axis
$d_{core,1}$ first core diameter
$d_{core,2}$ second core diameter
$d_{core,p}$ patch core diameter

The invention claimed is:

1. A wind turbine blade extending along a longitudinal axis from a root end to a tip end and in a transverse plane perpendicular to the longitudinal axis, the transverse plane having a main axis extending through an elastic center point, the wind turbine blade comprising:
   a blade shell forming a profiled contour including a pressure side and a suction side, as well as a leading edge and a trailing edge with a chord having a chord length extending there between, the main axis being parallel to the chord,
   wherein the profiled contour is divided into:
      a root region having a substantially circular or elliptical profile closest to the root end with a root diameter being the chord length at the root end,
      an airfoil region having a lift-generating profile furthest away from the root end, and
      a transition region between the root region and the airfoil region, the transition region having a profile gradually changing in the radial direction from the circular or elliptical profile of the root region to the lift-generating profile of the airfoil region; and
   a sensor system including a first sensor set for measuring a first bending moment in a first sensor position at a first distance from the root end, characterized in that the first sensor set only contains a first primary sensor for measuring a primary component and a first secondary sensor for measuring a secondary component, the first sensor set being arranged in the transition region or the airfoil region of the blade,
   wherein a first primary sensor axis in the transverse plane is oriented in a direction defined by the first primary sensor and the elastic center point, and a first secondary sensor axis in the transverse plane is oriented in a direction defined by the first secondary sensor and the elastic center point, and
   wherein an angle between the first primary sensor axis and the first secondary sensor axis is in the range from 85° to 95°.

2. The wind turbine blade according to claim 1, wherein the angle between the first primary sensor axis and the first secondary sensor axis is 90°.

3. The wind turbine blade according to claim 1, wherein the first primary sensor is positioned on the pressure side of the wind turbine blade.

4. The wind turbine blade according to claim 1, wherein the first secondary sensor is positioned at the leading edge of the wind turbine blade.

5. The wind turbine blade according to claim 1, wherein the wind turbine blade comprises a second sensor set for measuring a second bending moment in a second sensor position at a second distance from the root end, the second sensor set comprising a second primary sensor for measuring a primary component and a second secondary sensor for measuring a secondary component, wherein a second primary sensor axis in the transverse plane is oriented in a direction defined by the second primary sensor and the elastic center point, and a second secondary sensor axis in the transverse plane is oriented in a direction defined by the second secondary sensor and the elastic center point, and wherein an angle between the second primary sensor axis and the second secondary sensor axis is in the range from 50° to 130°.

6. The wind turbine blade according to claim 1, wherein the first distance is equal to at least a diameter of the root.

7. The wind turbine blade according to claim 1, wherein the primary and secondary sensors are strain gauge sensors.

8. The wind turbine blade according to claim 1, wherein the primary and secondary sensors are optical sensors, such as fiber Bragg gratings.

9. The wind turbine blade according to claim 1, wherein at least one of the sensors is embedded in the blade shell.

10. The wind turbine blade according to claim 1, wherein the wind turbine blade comprises a beam attached to the shell and wherein at least one of the sensors is mounted on the beam.

11. The wind turbine blade according to claim 1, wherein the length of the blade is at least 40 m.

* * * * *